United States Patent
Goldin (10) Patent No.: US 7,783,478 B2
(45) Date of Patent: Aug. 24, 2010

(54) TWO STAGE FREQUENCY SUBBAND DECOMPOSITION

(76) Inventor: Alexander Goldin, Votson 13a, Haifa (IL) 34751

( * ) Notice: Subject to any disclaimer, the term of this patent is extended or adjusted under 35 U.S.C. 154(b) by 830 days.

(21) Appl. No.: 11/648,682

(22) Filed: Jan. 3, 2007

(65) Prior Publication Data
US 2008/0162123 A1    Jul. 3, 2008

(51) Int. Cl.
G10L 21/00    (2006.01)
G10L 19/14    (2006.01)
H04M 9/00     (2006.01)
H04M 9/08     (2006.01)

(52) U.S. Cl. .................. 704/205; 704/201; 349/406.14; 349/392.01

(58) Field of Classification Search .................. None
See application file for complete search history.

(56) References Cited

U.S. PATENT DOCUMENTS

| | | | |
|---|---|---|---|
| 5,242,695 A | | 9/1993 | Paradise |
| 5,852,806 A | * | 12/1998 | Johnston et al. ............. 704/500 |
| 6,266,760 B1 | | 7/2001 | DeHon |
| 6,970,558 B1 | | 11/2005 | Schmidt |
| 7,003,101 B2 | | 2/2006 | Seibert |
| 7,010,119 B2 | | 3/2006 | Marton et al. |
| 7,369,989 B2 | * | 5/2008 | Absar et al. .................. 704/203 |
| 7,519,538 B2 | * | 4/2009 | Villemoes et al. ........... 704/501 |
| 2007/0233466 A1 | * | 10/2007 | Tammi ..................... 704/200.1 |

OTHER PUBLICATIONS

Crichiere, R.E. and Rabiner, L.R., Multirate Digital Signal Processing, Prentice Hall, 1983.
Vaidyanathan, P. P., Multirate Devices and Filter Banks, Prentice Hall, 1993.

* cited by examiner

*Primary Examiner*—Matthew J Sked
(74) *Attorney, Agent, or Firm*—Pearl Cohen Zedek Latzer, LLP (57) ABSTRACT

A method for multifunctional processing of signals in frequency subbands performs subband decomposition and signal processing in two stages. A fullband signal is first splitted, with downsampling, into wide frequency subband (WFS) signals. Processing algorithms not requiring a high frequency resolution but benefiting from downsampling (such as subband acoustic echo cancellation), are applied to the WFS signals by wide subband processing blocks. Processed WFS signals are splitted, preferably without downsampling, into groups of narrow frequency subband (NFS) signals. The NFS signals are processed using processing algorithms (noise suppression, etc.) requiring a higher resolution. Processed NFS signals are synthesized into processed WFS signals, which are recombined into an output signal. Two-stage processing makes it possible to optimize signal processing, while keeping computational costs at low level and avoiding undesirable time delays. Preferred embodiments of the inventions are intended for use as an echo canceller/noise suppressor in voice communication terminals.

15 Claims, 5 Drawing Sheets

TWO STAGE FREQUENCY SUBBAND DECOMPOSITION

BACKGROUND OF THE INVENTION

This invention relates to the field of digital signal processing employing frequency subband processing methods.

Frequency subband processing schemes are used in various practical applications in the communications field. They include but are not limited to acoustic echo cancellation, noise suppression, multiband dynamic range compression and microphone arrays. In many cases, subband technologies possess multiple advantages compared to their full band counterparts. For example, by using subband adaptive filtering processing algorithms, the significant reduction in computational complexity of adaptive filters can be achieved with the simultaneous improvement of both convergence and robustness. Dividing (splitting) original noisy signals into frequency subbands and adjusting each subband's gain opens a way to the efficient suppression of stationary noises without the so called "noise modulation" effect typical for the full band "noise gaiting" approach. Subband dynamic range compression leads to improvements in speech ineligibility in noisy environments by selectively and dynamically amplifying spectral regions where information is masked by ambient noise.

Subband decomposition schemes differ in:
  a computational scheme;
  a number of frequency subbands;
  a frequency overlap between adjacent subbands;
  a downsampling factor for the subband signals.

In regards to downsampling, subband decomposition schemes can be divided into two main classes:
  schemes employing downsampling, that is producing output subband signals with reduced sampling rate; and
  schemes without downsampling, in which schemes the output subband signals have an original sampling rate with only a part of an available full band spectrum used by subband signals.

Figure 1:
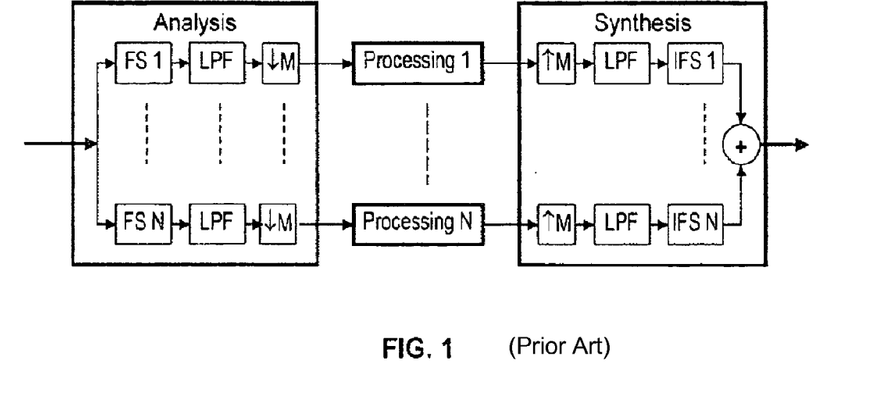
FIGS. 1 and 2 illustrate prior art schemes for frequency subband processing with and without downsampling.

FIG. 1 illustrates principles of subband decomposition and processing with downsampling. An input full band signal is first processed by an Analysis block where it is divided into N frequency subband signals (1, 2, . . . N). Each subband signal is then processed independently by its own Processing block. Processed subband signals are then recombined in a Synthesis block.

The Analysis block can be conceptually represented as comprising N Frequency Shifting (FS) subblocks, with each FS subblock followed by a Low Pass Filter (LPF) subblock and a downsampling subblock M for downsampling a filtered subband signal by a factor M. Each Frequency Shifting subblock shifts the input signal down in frequency so that the corresponding subband frequency region is located in the low frequencies. The following low pass filtering ensures that no spectral aliasing occurs after the downsampling stage, where each M-th sample is taken for forming the output subband signal.

The Synthesis block may be conceptually represented as comprising N upsampling subblocks for upsampling N processed subband signals by factor M and N LPF subblocks followed by N Inverse Frequency Shifting (IFS) subblocks. Upsampling by factor M can be performed by inserting M−1 zeros between processed subband samples. Corresponding replicas of the original subband spectrum are filtered out by the LPF subblocks. Finally, the IFS subblocks shift the filtered subband signals back in frequency into the corresponding frequency regions. Output subband signals are then summed up to produce a full band output signal.

The structure of the Analysis and Synthesis blocks described above was presented for illustration purposes only. Real devices can implement different sequences of operations for both analysis and synthesis as well as different computation schemes. Reference may be made here to R. E. Crochiere, L. R. Rabiner. "Multirate Digital Signal Processing", Prentice Hall, 1983, and P. P. Vaidyanathan. "Multirate Devices and Filter Banks", Prentice Hall, 1993. Subband processing with downsampling is further described in a number of patent publications, including, among many others, U.S. Pat. Nos. 7,003,101 (disclosing a method of controlling an echo canceller in a communications channel) and 7,010,119 (disclosing an echo canceller for an audio communication device).

Imperfect low-pass filtering before downsampling in the analysis stage and after upsampling in the synthesis stage results in frequency aliasing and corresponding distortions in the output full band signal. Subband decomposition with downsampling without aliasing requires a perfect frequency separation between bands, which is impossible to attain with real, finite length or finite order filters. Therefore, in practice some aliasing is always present with its maximal allowed level depending on a specific application. For real frequency subbands (subband samples are real numbers), the theoretical limit of downsampling factor without aliasing is equal to a number of subbands (M=N). Perfect frequency separation between subbands requires infinite order filters and for that reason cannot be implemented in practice. With a chosen low-pass filter order and a specified number N of frequency subbands, the level of aliasing can be reduced by using a lower downsampling factor M. However, such approach also reduces computational advantages of using subband processing schemes in certain types of applications (i.e such as adaptive filtering).

The length of the low-pas filters is generally chosen to provide an acceptable tradeoff between:
  maximizing the number N of frequency subbands to attain a maximal frequency resolution; —maximizing the downsampling ratio M/N to attain the maximal reduction of computational complexity; —minimizing the level of frequency aliasing to reduce output signal distortions; and—minimizing the order of the low-pass filter to reduce a filter group delay.

Figure 2:
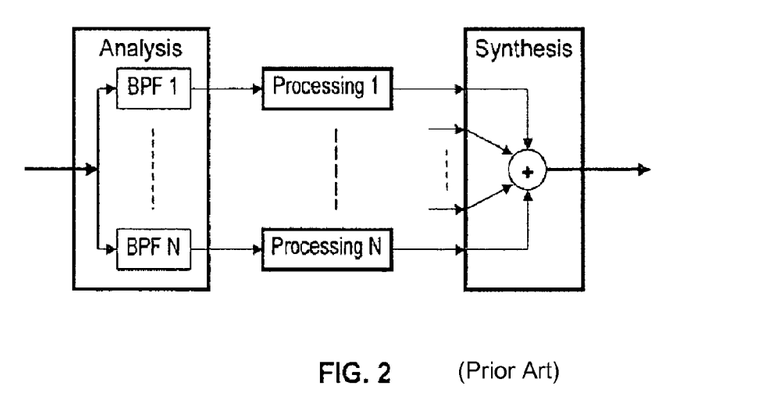

FIG. 2 illustrates a much simpler concept of subband decomposition and processing without downsampling. The input full band signal is divided into N frequency subband signals with a set of Band Pass Filter (BPF) subblocks. Since no downsampling is performed, the frequency subband signals can have a significant overlap, so that simple, relatively low group delay filters can be used. However, the computational advantages of the downsampling scheme of FIG. 1 are not available. Subband processing without downsampling is also described in a number of patent publications, such as U.S. Pat. Nos. 5,242,695 and 6,266,760 (both disclosing a subband echo canceller for audio applications); and U.S. Pat. No. 6,970,558 (disclosing an application of subband processing for suppressing noise in telephone devices).

In a typical communication device some digital signal processing tasks require high frequency resolution while others can perform well with only a moderate resolution. To give an example, when using the standard communication sampling rate of 8 kHz, a subband acoustic echo canceller and residual echo suppressor can perform well with the number of subbands as low as 4. In many applications, the computation scheme with downsampling is generally preferable due to computational advantages it provides. However, when a high frequency resolution is required, the downsampling/upsampling operations can introduce a substantial delay into signal processing. For example, good quality noise suppression requires a frequency resolution better than 50 Hz. For the sampling frequencies of 8 kHz and 32 kHz, it means a necessity of having respectively at least 80 subbands and at least 320 subbands. If such narrow subbands are used with substantial downsampling, the downsampling scheme (such as shown in FIG. 1) will introduce about 100 ms delay into the computational process. Such large delay is unacceptable for a majority of voice communication devices, in which devices subband processing in real time is generally required.

For the above reasons, there exists a long-felt need in effective means for subband processing of various input signals with providing the computational gains characteristic for the downsampling schemes, while at the same time substantially reducing disadvantages of such schemes when using a high frequency resolution.

BRIEF SUMMARY OF THE INVENTION

Accordingly, the main object of the present invention is to provide a method for multifunctional processing of input signals with a relatively high frequency resolution (that is employing processing in narrow frequency subbands) without introducing serious limitations for working in real time.

Another object consists in providing a method, easily adaptable to a wide range of different applications involving multifunctional processing based on the decomposition of input signals into frequency subbands.

These and other objects of the present invention are achieved primarily by employing a two-stage frequency decomposition principle, which involves dividing a full band input signal (or full band input signals) into wide frequency subbands and then dividing resulting wide frequency subband (WFS) signals into narrow frequency subband (NFS) signals. After appropriate processing of the WFS and the NFS signals, the NSF signals are recombined into the WFS signals, which signals, in their turn, are recombined into a full band output signal or full band output signals. Such two-stage decomposition and processing makes it possible to optimize multifunctional signal processing by applying to the WFS signals those processing algorithms, which do not require the high frequency resolution, while processing the NFS signals using only such algorithms, which need the high frequency resolution.

A basic method for multifunctional processing of input signals implementing the described double decomposition principle and corresponding to the first aspect of the present invention comprises the following main steps:

(a) receiving, via input means, at least one full band input signal;

(b) splitting the received input signal or each of the received input signals into $N_W$ ($N_W \geq 4$) wide frequency subband (WFS) signals with downsampling said WFS signals by factor of M1>1, wherein each of said WFS signals is associated with one of wide frequency subbands of said preselected frequency band;

(c) supplying at least some of the splitted WFS signals and/or one or more combination(s) of the splitted WFS signals, each combination including splitted WFS signals associated with the same wide frequency subband, as primary WFS signals to separate wide subband (WS) channels, each WS channel corresponding to a different wide frequency subband;

(d) processing at least one WFS signal in at least one WS channel by at least applying to said at least one WFS signal a processing algorithm selected from a first group of preselected processing algorithms, with transforming said at least one WFS signal into a secondary WFS signal to be further processed in said WS channel or to be applied, as a processed WFS signal, to the exit thereof, and (e) synthesizing WFS signals from exits of all WS channels into a full band output signal;

wherein step (d) further includes steps of:

(f) splitting at least one of the primary or secondary WFS signals into a group of $N_N$ ($N_N \geq 2$) narrow frequency subband (NFS) signals with downsampling said NFS signals by factor of M2≥1, wherein M2/$N_N$<M1/$N_W$;

(g) applying to at least one of the NFS signals at least one processing algorithm selected from a second group of preselected processing algorithms;

(h) synthesizing, for a single or each group of the NFS signals, at least some of the NFS signals obtained from said group into a synthesized WFS signal or synthesized WFS signals; and (i) supplying the synthesized WFS signal or each of the synthesized WFS signals for further processing in the same WS channel or to the exit of said WS channel.

According to a preferred embodiment of the invention, the frequency band to be used in implementing the multifunctional processing method is selected in the audio frequency range and is preferably divided into 4 to 128 wide frequency subbands to be further divided into 2 to 8 narrow frequency subbands, while M1 and M2 values are preferably selected in ranges from $N_W/4$ to $N_W$ and from 1 to M1/2 respectively. According to another preferred embodiment, signal processing in the narrow subbands is performed without any downsampling (that is with M2=1).

In accordance with the invention, the first group of processing algorithms (to be applied to the WFS signals) preferably comprises acoustic echo cancellation by subband adaptive filtering, residual echo suppression, comfort noise generation, beamforming, frequency equalization, dynamic equalization and dynamic range compression. The second group of processing algorithms (to be applied to the NFS signals) preferably comprises stationary noise suppression, tone detection, frequency equalization and selective blocking.

Further preferred embodiments of the proposed method (which will be described in more detail below) are directed to an optimal implementation of different combinations of processing algorithms selected from the above-presented groups of algorithms in various applications, which include (but are not limited to) front end processing in a voice communication terminal.

It is a further object of the present invention to provide a compact and flexible device suitable for implementing the above-described method for multifunctional processing of the full band input signals.

In its basic version, the device of the present invention comprises:

input means for acquiring at least one full band input signal;

at least one wide subband analysis (WSA) block for receiving said at least one input signal from the input means and for splitting said signal into $N_W$ ($N_W \geq 4$) wide frequency subband (WFS) signals with downsampling said WFS signals by factor of M1>1, wherein each of said splitted WFS signals is associated with one of wide frequency subbands of said preselected frequency band;

a plurality of WS channels, with each WS channel having an entrance and an exit and being associated with one of said wide frequency subbands, wherein each of said WS channels is adapted for receiving at its entrance, as a primary WFS signal, one of said splitted WFS signals or a combination of such WFS signals, wherein at least a group of said WS channels is adapted for processing the received primary WFS signal with forming a processed WFS signal to be applied to the exit of the WS channel, and wherein at least one WS channel in said group of the WS channels comprises at least one wide subband processing (WSP) block for applying to the WFS signal in said channel at least one processing algorithm selected from a first group of preselected processing algorithms, with transforming said WFS signal into a secondary WFS signal;

a WFS synthesizing block for receiving WFS signals from exits of all WS channels and for synthesizing the received WFS signals into a full band output signal; and output means for outputting said output signal;

wherein at least one of said WS channels in said group of WS channels comprises:

a narrow subband analysis (NSA) block for splitting at least one of the primary or secondary WFS signals into a group of $N_N$ ($N_N \geq 2$) narrow frequency subband (NFS) signals with downsampling said NFS signals by factor of $M2 \geq 1$, wherein $M2/N_N < M1/N_W$;

at least one narrow subband processing (NSP) block for applying to at least one of the NFS signals at least one processing algorithm selected from a second group of preselected processing algorithms;

a narrow subband synthesizing (NSS) block for receiving at least some of said NFS signals for synthesizing the received signals into a single synthesized WFS signal and for applying the synthesized WFS signal to a WSP block in the same WS channel or to the exit of said WS channel.

The device of the invention can be easily and flexibly adapted for a wide range of applications. One approach to such adaptation consists in connecting all or at least one WSP block either between the entrance of a corresponding WS channel and the NSA block (so that processing of the WFS signals is performed prior to processing of the NSF signals), or between the NSS block and the exit of said WS channel (so that NSF signals processing is performed prior to WFS signals processing). Another alternative solution provided by the invention consists in using (at least in one of the WS channels) not one, but two WSP blocks, with a first WSP block connected between the entrance of the WS channel and the NSA block and a second WSP block connected between the NSS block and the exit of said WS channel. It becomes possible, in this way, to perform appropriate processing of the WFS signals both before and after processing of the NFS signals. When employing such double WS processing, the first WSP block (preceding the NSA block) can be formed as a subband acoustic echo cancellation block, while the second WSP block can be adapted for applying a dynamic equalization algorithm or a dynamic range compression algorithm. A stationary noise suppression block is preferably used in this embodiment as the NSP block.

Practical examples of the above-mentioned combinations of processing in wide frequency and narrow frequency subbands will be supplied below.

The device of the invention can be further adapted for receiving in parallel and for processing two or more input signals (such as signals from an array of microphones). In this case, the input means shall be adapted to supply each of the received input signals to a separate WSA block, while each WS channel shall be adapted for receiving, as a primary WFS signal, a combination of the splitted WFS signals from all WSA blocks. Further, each of the WSP blocks in this embodiment of the proposed device preferably comprises a beamforming subblock adapted for processing the primary signal using the beamforming algorithm.

The WSP block in at least one of the WS channels can be adapted for generating at least one control signal representing a processing algorithm being applied to the WFS signal in the WSP block. Correspondingly, the NSP blocks in such WS channel shall be adapted to receive said at least one control signal and to change parameters of a processing algorithm applied by said NSP blocks in accordance with the received control signal. Owing to this feature, the performance of the device according to the invention can be flexibly optimized in real time (as will be explained in detail below).

Further, if the proposed device in one of its preferred embodiments is intended to be used for a front end processing in a voice communication terminal, the input means is preferably adapted for supplying: a main input signal containing an echo to one of two WSA blocks, and a reference input signal, from which the echo is to be generated, to another of two WSA blocks. Further, each WS channel in this embodiment shall be adapted for forming the primary WFS signal as a combination of two WFS signals received from said two WSA blocks, while the WSP block in each WS channel can be adapted to apply to the primary WFS signal the subband acoustic echo cancellation algorithm.

BRIEF DESCRIPTION OF THE SEVERAL VIEWS OF THE DRAWING

The above-described and further objects, features and advantages of the present invention will become apparent from the following detailed description of the preferred embodiments taken in conjunction with the attached drawings.

DETAILED DESCRIPTION OF THE INVENTION

Figure 3:
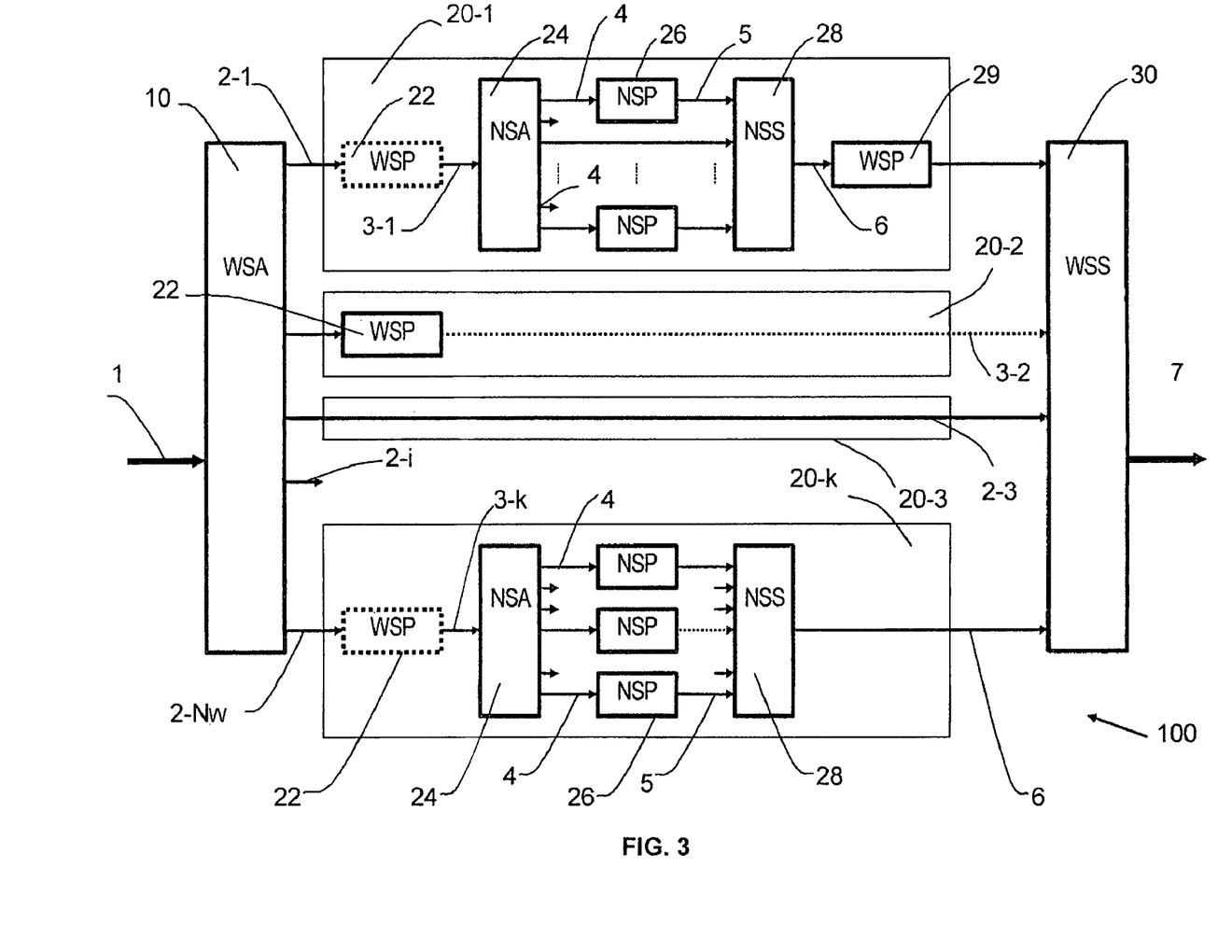
FIG. 3 is a block diagram illustrating main concepts of the present invention.

FIG. 3 shows, as a block diagram, a basic embodiment of the device (indicated in the drawings as 100) for multifunctional input signals processing according to the invention. The basic embodiment serves mainly for illustrating main principles of the present invention.

An input full band signal (indicated as 1) is received by input means (not shown in FIG. 3) and applied to a wide subband analysis (WSA) block 10 for splitting (decomposing) it into $N_W$ wide frequency subbands (WFS) signals 2 with downsampling factor $M1 > 1$. Thus, the WSA block 10 implements the first downsampling stage, and its frequency resolution (the number of bands) is chosen to satisfy the frequency resolution requirements of less demanding signal processing algorithms. As was explained in the discussion of the prior art devices, an optimal number of the wide frequency subbands shall depend, among other factors, from the sampling rate employed in the WSA block. When using the standard communication sampling rate of 8 kHz, for most practical applications $N_W$ can be selected in a range from 4 to 32. Increasing sampling rate will require a proportional increase in the number of the wide frequency subbands. Thus, if using sampling rate of 32 kHz, the suggested upper limit for the number of the wide frequency subbands will become 128. For clarity, only five such splitted WSA signals 2 are represented in FIG. 3.

The device 100 further comprises wide subband (WS) channels 20, with each WS channel corresponding to a different wide frequency subband associated with one of the splitted WFS signals 2. The total number of the WS channels 20 can be equal to the total number $N_W$ of the splitted WFS signals 2 or less than that number. The last case is illustrated by FIG. 3, which shows that the splitted WFS signal 2-i has no corresponding WS channel. This means that the signal 2-i is blocked, that is it is not used in forming an output full band signal. Because of blocking at least one of the splitted WFS signals, the total number k of the WS channels 20 in this example is less than $N_W$.

Such selective blocking of at least one of the splitted WFS signals can be advantageous in certain applications of the invention in the field of audio communications. More specifically, communication devices generally limit the range of transmitted audio frequencies. Directly on indirectly, audio signals are generally filtered by a band-pass filter before being transmitted. For the standard telephony, the filter passband is generally between 300 and 3500 Hz. For mobiles phones a similar frequency range is used. Modern Voice Over IP devices or special communication devices may use wider frequency ranges. Due to the above frequency limitations, some of the wide frequency subbands can be located completely outside (either below or above) the frequency range of a particular communication device. Processing such subbands will evidently lead to an unnecessary increase of required computational resources. Therefore, it is preferable to block WFS signals in such subbands and to replace them, while recombining WFS signals, by zeros. For example, in the standard telephony applications signals in the WF subband(s) corresponding to frequencies below 300 Hz can be advantageously blocked.

Simultaneously with or alternatively to selective blocking, at least one of the WS channels (represented in FIG. 3 by the WS channel 20-3) can be formed as a simple connection between the WSA block 10 and a wide subband synthesis (WSS) block 30 for applying a corresponding WFS signal 2-3 directly to a corresponding entrance of the WSS block 30. Such, extremely simplified, structure of one or more of the WS channels can be advantageous for embodiments of the invention intended for applications (i.e those employing a microphone array as the input means) in cases when, for a high frequency part of the employed frequency range, an acoustic noise level decreases with an increase of frequency. Consequently, noise level in wide frequency subbands belonging to an upper part of the employed frequency band can become very weak and so not detectable when using a processor with finite word length. For such cases, it becomes preferable not to do any processing in these WF subbands and to pass corresponding WFS signals directly to the WSS block.

Typically, however, all or a main part of the WS channels (such as the WS channel 20-1, 20-2, 20-k) will comprise a wide subband processing (WSP) block 22 adapted for receiving, as a primary WFS signal, the splitted WFS signal 2 supplied to an entrance (not indicated in the figures) of the corresponding WS channel and for applying to said primary WFS signal an appropriate algorithm, with producing a secondary WFS signal 3. It shall be noted that only those algorithms shall be employed in the WSP blocks 22, which do not require for their effective implementation the high frequency resolution. As an example of such algorithms, comfort noise generation can be mentioned.

In some cases (represented in FIG. 3 by the WS channel 20-2), the WSP block 22 will be a single processing block comprised by the WS channel. However, in all embodiments of the invention at least one WS channel (but typically a major part of the WS channels 20 or even each WS channel) additionally comprises means for splitting the WFS signal in said channel into a group of $N_N$ ($N_N \geq 2$) narrow frequency subband (NFS) signals and for processing said NSF signals using appropriate processing algorithms. As shown in FIG. 3 for the WS channels 20-1 and 20-k, said means in each appropriate WS channel include a narrow subband analysis (NSA) block 24 for receiving the WFS signal and splitting it into a group of $N_N$ narrow frequency subband (NFS) signals 4. While minimal value for $N_N$ is equal to 2, in practical embodiments of the device 100 this value is determined by a frequency resolution required for efficient application of appropriate processing algorithms (which will be specified below). In some applications, the required frequency resolution can be a function of frequency. To give an example, the frequency resolution of a human ear is proportional to frequency except for the low frequency region. Therefore, in appropriate cases (i.e. when employing a frequency equalizing algorithm) it is advantageous to split different WFS subbands into different number of the NSF subbands in order to save computational resources and memory requirements. In other words, $N_N$ value shall not be necessarily considered to be constant for all WS channels. This approach is schematically illustrated in FIG. 3, where WS channels 20-1 and 20-k are shown as using 4 and 6 narrow frequency subbands respectively.

In preferred embodiments of the invention, at least one WS channel (but typically a major part of the WS channels 20 or even each WS channel), in addition to the NSA block 24, comprises narrow subband processing (NSP) blocks 26, each NSP block receiving one splitted NSF signal 4 and applying thereto at least one appropriate processing algorithm requiring the high frequency resolution (such as, for example, a noise suppression algorithm). NSF signals 5 processed in the NSP blocks 26 (in each WS channel using such processing) are supplied to the NSS block 28 for synthesizing (recombining) them into a synthesized WFS signal 6.

As shown in FIG. 3 for the WS channels 20-1, 20-k, in certain cases one or more of the splitted NSF signals 4 in one or more WS channels can be blocked. Such selective blocking can be useful in particular when narrow subbands employed by the NSA blocks 24 in splitting the WFS signals correspond to a fine frequency resolution, so that, while preserving most of the used frequency range, some narrow band (tone) signals can be rejected by selective blocking, while passing remaining NSF signals directly from the NSA block 24 to the NSS block 28. For speech signals such procedure will allow preserving a full speech content while blocking, for example, DTMF (Dual-Tone Multiple-Frequency) signal frequencies. Appropriate WFS processing (such, as for example dynamic equalization and dynamic range compression) can still be performed in this case.

All synthesized WFS signals 6 can be directly applied, as processed WFS signals, to the WSS block 30, which block synthesizes all received WFS signals into a full band output signal 7 or (in some embodiments) into full band output signals. A direct connection between the NSS block 28 and the WSS block 30 is illustrated in FIG. 3 for the WS channel 20-k. Alternatively, one or more WS channels 20 can additionally comprise a WSP block 29 connected between the NSS block 28 and the exit (not indicated in the drawings) of the WS channel 20. Such alternative connection of the NSP block 24 is illustrated in FIG. 3 for the WS channel 20-1. As can be seen, in the embodiment of the device 100 presented in FIG. 3 the WS channel 20-1 comprises two WSP blocks 22, 29, so this channel is adapted for applying the appropriate processing algorithm(s) not only to the primary WFS signal 2-1 received by this channel, but also to the WFS signal 6 synthesized from the NSF signals 5.

For example, an acoustic echo cancellation WSP block using adaptive filter shall precede a noise suppression NSP block (that is, such WSP block shall be used as the WSP block 22), because noise suppression (which is a non-linear process) will impede performance of adaptive filters. On the other hand, dynamic equalization or dynamic range compression WSP blocks shall follow the NSS blocks 28 (that is, such WSP blocks shall be used as the WSP blocks 29). Otherwise, they will affect noise level estimation inside noise suppression NSP blocks.

In other alternative embodiments (i.e. in those not applying the acoustic echo cancellation algorithm), each or at least one of the WS channels 20 can be structured without the WSP block 22 (such possibility is illustrated in FIG. 3 by drawing a contour of the WSP blocks 22 in the WS channels 20-1 and 20-$k$ using dashed lines). In some of such embodiments at least one WS channel (i.e. WS channel 20-$k$) or a part of the WS channels (but not all WS channels) can comprise only NSP blocks, but no WSP block. Such structure of the WS channel can be recommended in cases, when processing in WFS subbands corresponding to a part of the working frequency range is not recommended. For example, in microphone array applications the upper frequency at which acoustic beamforming is possible without special aliasing is limited by a frequency corresponding to a wavelength equal to a half of the distance between array microphones. Wide frequency subbands above this limiting frequency cannot be processed by beamforming algorithms. Instead, an individual microphone signal (preferably from the microphone closest to a sound source) is to be taken. At the same time, noise suppression algorithm can be efficiently applied to the NSF signals irrespective of the frequency region. Therefore, the WFS signals associated with subbands above the limiting frequency can be passed directly to the NSA blocks, processed by the NSP noise suppression blocks and assembled into secondary WFS signals.

As shall be clear from the above-described embodiment of the device 100, the present invention provides substantially improved flexibility in applying different kinds of processing to input signals. The main advantage of the invention evidently consists in that it becomes possible, when using the invention, to provide optimal conditions for simultaneously applying processing algorithms, which need a relatively high frequency resolution (i.e. stationary noise suppression, tone detection and/or frequency equalization), and algorithms that greatly benefit from high downsampling factor, but can be effectively applied to signals obtained with a relatively low frequency resolution (i.e. acoustic echo cancellation by subband adaptive filtering). As a result, a good quality processing can be achieved with a relatively low processing delay (compared to performing all computations with a high frequency resolution) and at a low or moderate computational complexity meaning low processing costs. An additional processing flexibility is attained by providing possibilities for processing WFS signals either before or after NSF signals processing or both before and after NSF signals processing. Moreover, the present invention makes it possible to apply to selected signals no processing in some wide frequency subbands and/or in some narrow frequency subbands, while processing other WFS signals and/or other NSF signals. Still further advantages of the invention will become clear from a description of other embodiments presented below.

Figure 4:
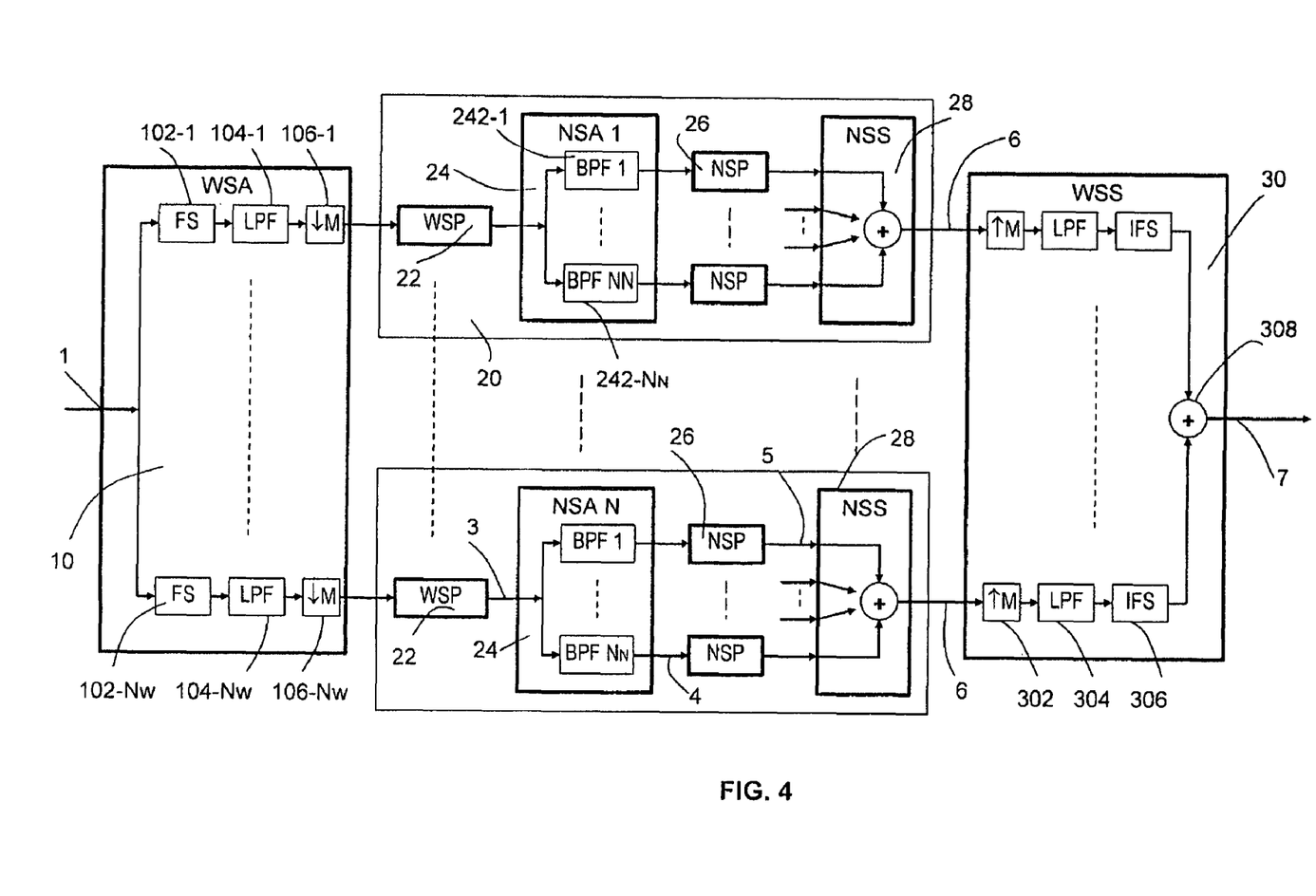
FIG. 4 is a block diagram illustrating preferred structures for various blocks constituting the device of the invention.

FIG. 4 shows a simplified basic version of the device 100 in more detail. As can be seen from FIG. 4, the WSA block 10 can be structured similar to the Analysis block in the prior art scheme illustrated by FIG. 1. More specifically, the illustrated WSA block 10 comprises $N_W$ similar circuits, each circuit consisting of a frequency shifting (FS) subblock 102 followed by a low pass filter (LPF) subblock 104 and a downsampling subblock 106 indicated also as $\downarrow$M. A specific value of a downsampling factor M1>1 provided by the subblock 106 is selected, for a majority of practical applications of the device 100, in the range of $N_W/4$ to $N_W$, with an optimal selection of M1 value being dependent on an intended application of the device.

Each NSA block 24 is preferably composed (as shown in FIG. 4) with $N_N$ band pass filter (BPF) subblocks 242, which can be made similar to the BPF subblocks widely used in the prior art systems (and schematically indicated in FIG. 2). Both FIR and IIR filters can be used in the BPF subblocks 242. The advantages of the IIR filters consist in that they introduce less processing delay and can be made computationally simpler. It can be seen from FIG. 4 that in the represented embodiment of the device 100 the NSA blocks 24 operate without any downsampling (the downsampling factor M2 is equal to 1). If, however, the NSF signals are to be downsampled, then the preferable M2 value corresponds to M1/2. In any case, the following relation between M1 and M2 shall apply to all embodiments of the invention: $M2/N_N < M1/N_W$. As was already mentioned, in this case the NFS subbands can have a larger overlap than the WFS subbands, so that simpler filters with a lower group delay can be used as subblocks 242.

The NSS block 28, in its simplest version, can be formed as a summator combining all received NSF signals into a single synthesized WFS signal 6. The WSS block 30, as shown in FIG. 4, can be structured similarly to the Synthesis block shown in FIG. 1 and adapted for receiving the WFS signals 6 from the exits (not shown in the drawings) of all WS channels 20. More specifically, the WSS block 30 in the presented embodiment comprises a plurality of upsampling circuits, with each such circuit comprising an upsampling subblock 302 (indicated in FIG. 4 also as $\uparrow$M) for upsampling the received WFS signal by factor M1 followed by a LPF subblock 304 followed, in its turn, by an IFS subblock 306. Output signals from all umpsampling circuits are recombined in a summator 308 to produce the full band output signal 7 applied to output means of the device 100 (not shown in the drawings).

Two embodiments intended for use in voice communication systems will be described below as non-limiting examples of a wide range of potential applications for the method and the device of the present invention.

Figure 5:
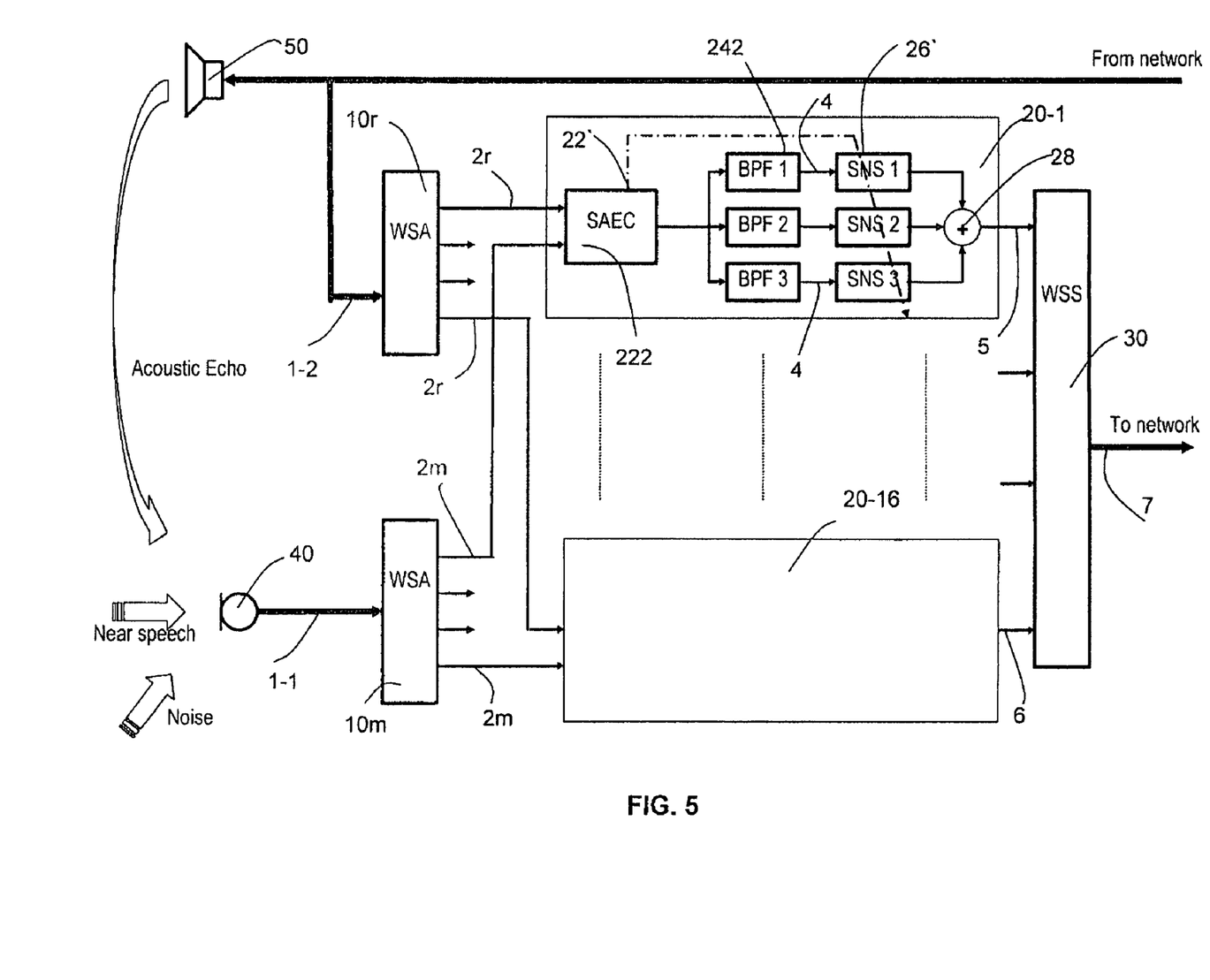
FIG. 5 shows a preferred embodiment structured as an echo canceller combined with a noise suppressor.

FIG. 5 illustrates an embodiment of the device 100 according to the present invention, which combines echo and noise cancellation functionalities and is adapted for the front end processing in a hands-free car kit, an office speakerphone or in other voice communication terminals. Such terminal devices reproduce acoustic signals (e.g. speech) received from a communication network while simultaneously transmitting to the network acoustic signals recorded locally. These devices often have a strong acoustic coupling between their built-in speaker and microphone. Acoustic coupling causes a microphone (uplink) signal to contain a part of a speaker (downlink) signal. If not treated by an acoustic echo canceller, this feedback part is perceived as echo on the other (far) side of the connection. To ensure echo cancellation, in addition to the main input signal 1m (a voice signal containing noise and an echo, which signal is supplied from a microphone 40 or from another appropriate input means), a reference input signal 1r (from which the echo shall be generated) is needed. As shown in FIG. 5, the downlink signal reproduced by the speaker 50 can be employed as such reference input signal; evidently, other alternative means for supplying the reference signal can be also used. For example, additional reference microphone can be placed in a very short proximity to the speaker 50. Each of the two input signals 1m, 1r is applied to a separate WSA block 10m, 10r and is splitted, with appropriate downsampling, by said WSA block into $N_W$-splitted WFS signals 2m, 2r respectively. In the embodiment shown in FIG. 5 each splitted WFS signal is used, after an appropriate processing (described below) for forming a full band output signal. It means that the device 100 in this case comprises $N_W$ WS channels 20 (only two such channels are shown, for clarity, in FIG. 5). Each WS channel receives, as the primary WFS signal, a pair of the splitted WFS signals 2m, 2r associated with the same wide frequency subband. All WS channels 20 have the same structure, with each channel comprising a WSP block 22' formed as a subband acoustic echo cancellation (SAEC) block 222, which is adapted for applying to the received primary WFS signal such processing algorithms, as adaptive filtering (echo cancellation), subband residual echo suppression and/or comfort noise generation.

Performing echo cancellation in subbands with downsampling provides numerous benefits, such as reduced computational complexity, better convergence of adaptive filters, sophisticated residual echo suppression and easy matching comfort and real noise spectra. Reduction in computational complexity of adaptive filtering is proportional to the number of bands and to the downsampling factor. However, using a large number of bands and a high downsampling factor requires application of high order filters which increase complexity and processing delay. As a tradeoff between those controversial requirements, in the embodiment of FIG. 5 the input signals 1 are divided by the WSA blocks into 16 WFS signals.

The secondary WFS signal 3 forming the output signal of the SAEC block in each WS channel is used as the input to the NSA block consisting in this case of three BPF sublocks 242 and therefore splitting the WFS signal into three NSF signals 4. Said splitting of the WFS signal is performed with no downsampling and with using low order, low group delay filters (preferably, such as short FIR filters). Said splitting increases the frequency resolution for the three NSP blocks 26' following the NSA block and formed as stationary noise suppression (SNS) blocks. Processed NSF signals 5 from the SNS blocks are synthesized (recombined) into the processed WFS signal 6 by the NSS block 28 formed as a simple summator. The WSS block 30 has identical functions to those of the WSS block described with reference to FIGS. 3 and 4 and so can be formed similarly to said described WSS block.

In certain types of applications (including the one illustrated by FIG. 5), the NSP block 26' in each WS channel or at least in some WS channels can be controlled, in an appropriate way, by the WSP block of the same WS channel. Such possibility is schematically indicated in FIG. 5 by dash-dotted lines corresponding to control lines. It shall be noted that such kind of control can be performed only by the WSP block 22 located in the WS channel before the NSP blocks to be controlled, but not by the WSP block 29 (shown in FIG. 3), which follows the NSS block 28.

The use of the above-discussed control of the NSP blocks in relation to the embodiment of FIG. 5 can be advantageous for the following reason. Subband noise suppression requires estimating a noise level in each subband. However, noise present in the output signal of the SAEC block 22' can be one of two kinds: a true noise or a comfort noise. The true noise is present, when the subband is open by a residual echo suppression algorithm implemented as a part of the subband acoustic echo cancellation procedure. The comfort noise is intentionally inserted by the SAEC block 22' into the secondary WFS signal for improving listening experience, when the residual echo suppressor closes the subband. Characteristics of the comfort noise are only estimates of those of the true noise. To avoid convergence of noise level estimates to wrong values, a noise estimation function in the NSS blocks 28 is frozen for a period, during which said blocks receive from the SAEC block a control signal informing the SNS blocks 26' that the comfort noise is being inserted into the secondary WFS signal by the SAEC block 22'.

Due to the use of the two stage frequency subband decomposition scheme suggested by the invention, the described embodiment shown in FIG. 5 ensures high quality, high frequency resolution during noise suppression, while attaining simultaneously a relatively low overall processing delay (about 15 ms for 16 WFS and 8 kHz sampling frequency) and a high downsampling factor (6-10 for 16 real values WFS) for the echo canceling.

Figure 6:
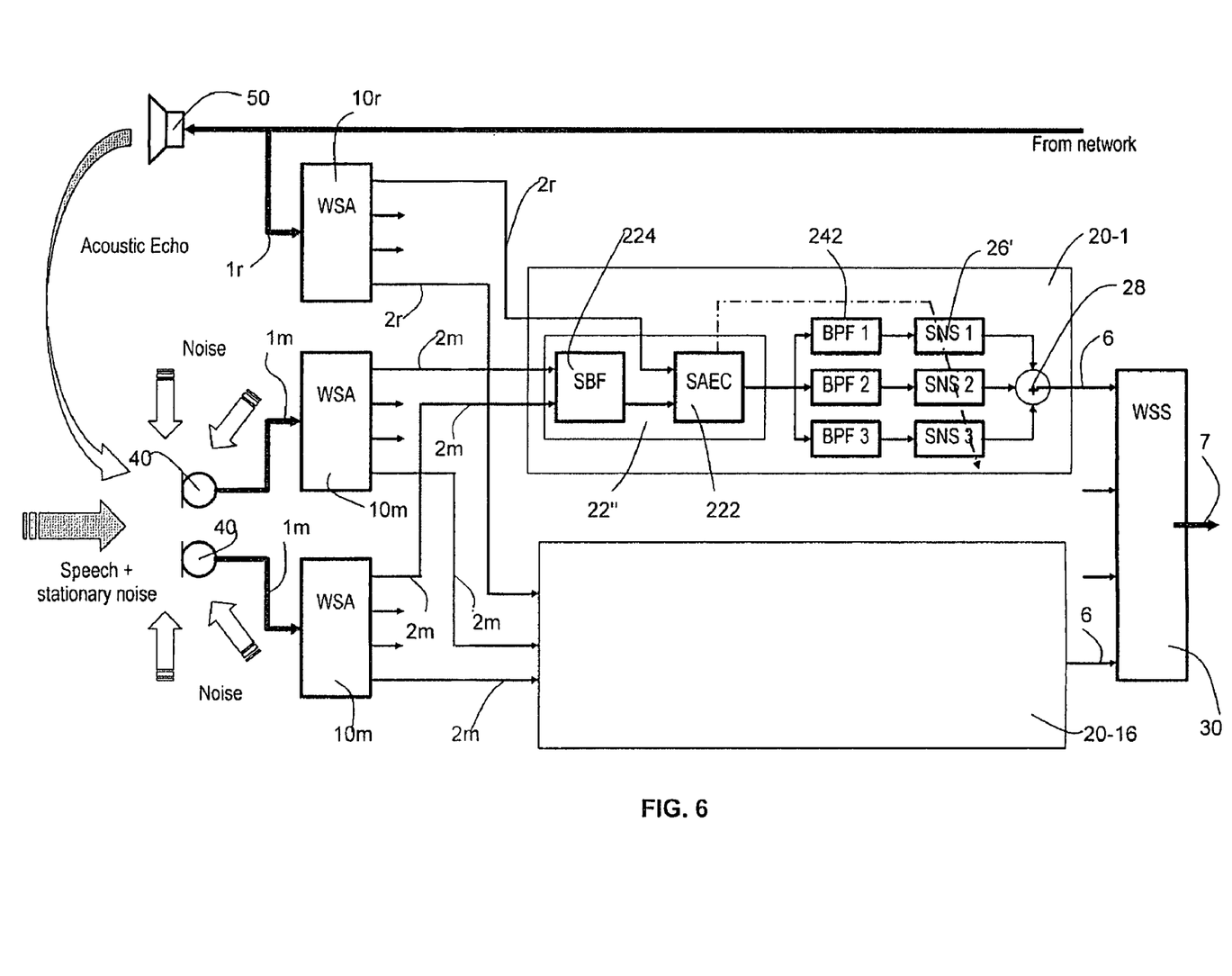
FIG. 6 shows an embodiment intended for adaptive beamforming combined with acoustic echo and noise cancellation.

FIG. 6 illustrates an extension of the application shown in FIG. 5. The input means in the device 100 shown in FIG. 6, instead of a single microphone, comprises an array of microphones 40 (only two of which are shown for clarity), with each microphone 40 of the array connected to a separate WSA block 10m. The WSA blocks 10m can be made identical to the WSA blocks employed in the preceding embodiment of FIG. 5. The use of the microphone array makes it possible to implement acoustic beamforming in order to reduce initially acoustic echo and noise by providing the maximal sensitivity in the direction of main sound source and a reduced sensitivity in other directions. According to the invention, beamforming is performed in the wide frequency subbands. To this purpose, the WSP block 22" in each WS channel 20 comprises a subband beamforming (SBF) subblock 224. The SBF subblock 222 receives, as the primary WFS signal, a combination of the splitted WFS signals 2m from all WSA blocks 10m connected to the microphones 40. Evidently, all said splitted WFS signals received by any of the SBF subblocks 224 correspond to the same WS subband, which is associated to the WS channel comprising the SBF subblock. Each such subblock applies to the received primary WFS signal an appropriate beamforming algorithm and supplies a resulting beamformed WFS signal to a SAEC subblock 222 of the WSP block 22". In addition to the beamformed WFS signal, each SAEC subblock 224 receives the WFS signal 2r splitted from the reference signal by a separate WSA block 10r. All other components of the device 100 presented in FIG. 6 are essentially the same as the above-described similar components of the embodiment shown in FIG. 5. Moreover, similar components in both embodiments perform, essentially in the same way, precisely the same functions (including the above-described control function performed by the SAEC subblocks), so there is no need to describe the device 100 shown in FIG. 6 in more detail.

While the invention has been described with references to certain embodiments, it will be understood by those skilled in the art that various changes may be made and equivalents may be substituted without departing from the scope of the invention. In addition, many modifications (such as employing other processing algorithms or other electronic circuits or blocks) may be made to adapt a particular situation or an application to the teachings of the invention without departing from its scope. Therefore, it is intended that the invention not be limited to the particular embodiments disclosed, but will include all embodiments falling within the scope of the appended claims.

I claim:

1. A method for multifunctional processing of input signals in frequency subbands of a preselected frequency band, the method comprising steps of:
   (a) receiving, via input means, at least one full band input signal;
   (b) splitting the received input signal or each of the received input signals into $N_W$ wide frequency subband (WFS) signals with downsampling said WFS signals by factor of M1>1, wherein each of said WFS signals is associated with one of wide frequency subbands of said preselected frequency band;
   (c) supplying at least some of the splitted WFS signals and/or one or more combination(s) of the splitted WFS signals, each combination including splitted WFS signals associated with the same wide frequency subband, as primary WFS signals to separate wide subband (WS) channels, each WS channel corresponding to a different wide frequency subband;
   (d) processing at least one WPS signal in at least one WS channel by at least applying to said at least one WFS signal a processing algorithm selected from a first group of preselected processing algorithms, with transforming said at least one WFS signal into a secondary WFS signal to be further processed in said WS channel or to be applied, as a processed WFS signal, to the exit thereof; and
   (e) synthesizing WFS signals from exits of all WS channels into a full band output signal; wherein step (d) further includes steps of:
   (f) splitting at least one of the primary or secondary WFS signals into a group of $N_N$ narrow frequency subband (NFS) signals with downsampling said NFS signals by factor of M2≧1, wherein $M2/N_N < M1/N_W$;
   (g) applying to at least one of the NFS signals at least one processing algorithm selected from a second group of preselected processing algorithms,
   (h) synthesizing, for a single or each group of the NFS signals, at least some of the NFS signals obtained from said group into a synthesized WFS signal or synthesized WFS signals, and
   (i) supplying the synthesized WFS signal or each of the synthesized WFS signals for further processing in the same WS channel or to the exit of said WS channel;
   wherein said preselected frequency band is selected in the audio frequency range,
   $N_W$ is selected in the range of 4 to 128,
   $N_N$ is selected in the range of 2 to 8,
   M1 is selected in the range of $N_W/4$ to $N_W$, and
   M2 is selected in the range of 1 to M1/2.

2. The method according to claim 1, wherein M2=1.

3. The method according to claim 1, wherein:
   the first group of preselected processing algorithms comprises acoustic echo cancellation by subband adaptive filtering, residual echo suppression, comfort noise generation, beamforming, frequency equalization, dynamic equalization and dynamic range compression; and
   the second group of preselected processing algorithms comprises stationary noise suppression, tone detection, frequency equalization and selective blocking.

4. The method according to claim 3, wherein:
   step (d) comprises application of an acoustic echo canceling algorithm to the primary WFS signals and application of a dynamic equalization algorithm and/or a dynamic range compression algorithm to the synthesized WFS signals,
   step (f) is performed for the secondary WFS signals; and
   step (g) comprises an application of a noise reduction algorithm to the NFS signals.

5. The method according to claim 3, wherein:
   at least one processing algorithm at step (d) is applied to the primary WFS signals in each of the group of WS channels; and
   step (f) is performed for at least some of said primary WFS signals.

6. The method according to claim 5, wherein:
   step (a) comprises receiving at least two input signals;
   step (c) comprises supplying to each of the WS channel a primary WFS signal consisting of a combination of at least two WFS signals splitted from different input signals; and
   step (g) comprises application of a stationary noise suppression algorithm to the NFS signals.

7. The method according to claim 6, the method being adapted to front end processing in a voice communication terminal, wherein:
   one of said input signals is a main input signal containing an echo and another input signal is a reference input signal, from which the echo is to be generated; and
   step (d) comprises applying the subband acoustic echo cancellation algorithm to the primary WFS signals.

8. The method according to claim 6, wherein:
   each input signal contains a signal of interest, interfering signals plus uncorrelated stationary noise; and
   step (d) comprises applying the beamforming algorithm to the primary WFS signals.

9. The method according to claim 5, wherein application of at least one processing algorithm to the NFS signals at step (g) is controlled in each of the WS channels by sending to narrow subband processing (NSP) blocks performing said step (g) at least one control signal representing a processing algorithm being applied to the WFS signal in the same WS channel.

10. The method according to claim 9, wherein the stationary noise suppression algorithm, said algorithm including the noise estimation, is applied to the NSF signals and wherein said control signal is adapted for disabling said noise estimation if said processing algorithm applied to the WFS signal is a comfort noise generation algorithm.

11. A device for multifunctional processing of input signals in frequency subbands of a preselected frequency band, the device comprising:
   input means for acquiring at least one full band input signal;
   at least one wide subband analysis (WSA) block for receiving said at least one input signal from the input means and for splitting said signal into $N_W$ ($N_W \geq 4$) wide frequency subband (WFS) signals with downsampling said WFS signals by factor of M1>1, wherein each of said splitted WFS signals is associated with one of wide frequency subbands of said preselected frequency band;
   a plurality of wide subband (WS) channels, with each WS channel having an entrance and an exit and being associated with one of said wide frequency subbands, wherein each of said WS channels is adapted for receiving at its entrance, as a primary WFS signal, one of said splitted WFS signals or a combination of such WFS signals, wherein at least a group of said WS channels is adapted for processing the received primary WFS signal with forming a processed WFS signal to be applied to the exit of the WS channel, and wherein at least one WS channel in said group of the WS channels comprises at least one wide subband processing (WSP) block for applying to the WFS signal in said channel at least one processing algorithm selected from a first group of preselected processing algorithms, with transforming said WFS signal into a secondary WFS signal;

a WFS synthesizing block for receiving WFS signals from exits of all WS channels and for synthesizing the received WFS signals into a full band output signal; and output means for outputting said output signal;

wherein at least one of said WS channels in said group of the WS channels comprises:

a narrow subband analysis (NSA) block for splitting at least one of the primary or secondary WFS signals into a group of $N_N$ ($N_N \geq 2$) narrow frequency subband (NFS) signals with downsampling said NFS signals by factor of $M2 \geq 1$, wherein $M2/N_N < M1/N_W$;

at least one narrow subband processing (NSP) block for applying to at least one of the NFS signals at least one processing algorithm selected from a second group of preselected processing algorithms, and a narrow subband synthesizing (NSS) block for receiving at least some of said NFS signals, for synthesizing the received signals into a single synthesized WFS signal and for applying the synthesized WFS signal to a WSP block in the same WS channel or to the exit of said WS channel as the processed WFS signal;

wherein in at least one of the WS channels the WSP block is connected between the entrance of said WS channel and the NSA block, wherein the WSP block in at least one of the WS channels is adapted for generating at least one control signal representing a processing algorithm being applied to the WFS signal in the WSP block, while the NSP blocks in said at least one of the WS channels are adapted to receive said at least one control signal and to change parameters of a processing algorithm currently applied by said NSP blocks in accordance with the received control signal.

12. The device according to claim 11, the device being adapted to front end processing in a voice communication terminal, wherein:

the input means is adapted for supplying: a main input signal containing echo to one of two WSA blocks and a reference input signal, from which the echo is to be generated, to another of two WSA blocks;

each WS channel is adapted for receiving WFS signals from said two WSA blocks and for forming the primary WFS signal as a combination of two received WFS signals; and the WSP block in each WS channel is adapted to apply to said primary WFS signal a subband acoustic echo cancellation algorithm.

13. A device for multifunctional processing of input signals in frequency subbands of a preselected frequency band, the device comprising:

input means for acquiring at least one full band input signal;

at least one wide subband analysis (WSA) block for receiving said at least one input signal from the input means and for splitting said signal into $N_W$ ($N_W \geq 4$) wide frequency subband (WFS) signals with downsampling said WFS signals by factor of $M1 > 1$, wherein each of said splitted WFS signals is associated with one of wide frequency subbands of said preselected frequency band;

a plurality of wide subband (WS) channels, with each WS channel having an entrance and an exit and being associated with one of said wide frequency subbands, wherein each of said WS channels is adapted for receiving at its entrance, as a primary WFS signal, one of said splitted WFS signals or a combination of such WFS signals, wherein at least a group of said WS channels is adapted for processing the received primary WFS signal with forming a processed WFS signal to be applied to the exit of the WS channel, and wherein at least one WS channel in said group of the WS channels comprises at least one wide subband processing (WSP) block for applying to the WFS signal in said channel at least one processing algorithm selected from a first group of preselected processing algorithms, with transforming said WFS signal into a secondary WFS signal;

a WFS synthesizing block for receiving WFS signals from exits of all WS channels and for synthesizing the received WFS signals into a full band output signal; and output means for outputting said output signal;

wherein at least one of said WS channels in said group of the WS channels comprises:

a narrow subband analysis (NSA) block for splitting at least one of the primary or secondary WFS signals into a group of $N_N$ ($N_N \geq 2$) narrow frequency subband (NFS) signals with downsampling said NFS signals by factor of $M2 \geq 1$, wherein $M2/N_N < M1/N_W$;

at least one narrow subband processing (NSP) block for applying to at least one of the NFS signals at least one processing algorithm selected from a second group of preselected processing algorithms, and a narrow subband synthesizing (NSS) block for receiving at least some of said NFS signals, for synthesizing the received signals into a single synthesized WFS signal and for applying the synthesized WFS signal to a WSP block in the same WS channel or to the exit of said WS channel as the processed WFS signal;

wherein the input means is adapted for receiving in parallel two or more input signals and to supply each of said input signals to a separate WSA block; and each WS channel is adapted for receiving, as a primary WFS signal, a combination of splitted WFS signals from the WSA blocks.

14. The device according to claim 13, wherein:

the input means comprises an array of microphones, each microphone applying, via the input means, a signal containing a voice signal plus noise to a separate WSA block of the array of WSA blocks; and each WS channel comprises the WSP block having a beamforming subblock adapted for processing the primary signal using the beamforming algorithm, with supplying the secondary WFS signal to another processing subblock inside said WSP block or to the NSA block connected to said WSP block.

15. The device according to claim 14, the device being adapted to a front end processing in a voice communication terminal, wherein:

the input means is further adapted for supplying to a separate WSA block a reference signal from which the echo is to be generated; and each WSP block further comprises a subband acoustic echo canceling subblock adapted for receiving a secondary WFS signal from the beamforming subblock together with a primary reference WFS signal obtained by splitting said reference signal in said separate WSA block, and for processing the received combination of signals using the acoustic echo canceling algorithm, with supplying the secondary WFS signal to the NSA block connected to said WSP block.

* * * * *